United States Patent Office 3,282,929
Patented Nov. 1, 1966

3,282,929
METHOD FOR PREPARATION OF AROMATIC A RING STEROIDS
Milton Heller, New City, N.Y., Robert Herman Lenhard, Ridgefield Park, N.J., and Seymour Bernstein, New City, N.Y., assignors to American Cyanamid Company, Stamford, Conn., a corporation of Maine
No Drawing. Filed July 6, 1964, Ser. No. 380,618
11 Claims. (Cl. 260—239.55)

This invention relates to a new method of preparing rings AB aromatic steroids.

The methods of preparing steroids of the present invention may be illustrated by the following equation:

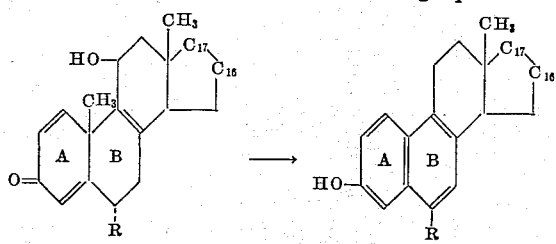

wherein $C_{17}$-$C_{16}$ is a divalent radical of the group consisting of

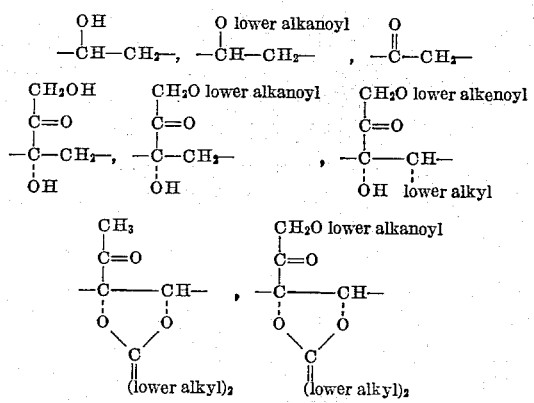

and R is a member of the group consisting of hydrogen, fluorine and lower alkyl.

The steroids of the present invention are substantially insoluble in water and somewhat soluble in the usual organics solvents.

The specific intermediates found useful in the process of this invention include:

17β-acetoxy-11β-hydroxyandrosta-1,4,8-trien-3-one;
11β-hydroxyandrosta-1,4,8-triene-3,17-dione;
21-acetoxy-11β,17α-dihydroxy-pregna-1,4,8-triene-3,20-dione;
11β,17α,21-trihydroxy-1,4,8-triene-3,20-dione;
21-acetoxy-6α-fluoro-11β,17α-dihydroxypregna-1,4,8-triene-3,20-dione;
21-acetoxy-11β,17α-dihydroxy-6α-methylpregna-1,4,8-triene-3,20-dione;
21-acetoxy-11β,17α-dihydroxy-16α-methylpregna-1,4,8-triene-3,20-dione;
21-acetoxy-11β-hydroxy-16α,17α-isopropylidenedioxy-pregna-1,4,8-triene-3,20-dione;
21-acetoxy-6α-fluoro-11β-hydroxy-16α,17α-isopropylidenedioxypregna-1,4,8-triene-3,20-dione;
11β-hydroxy-16α,17α-isopropylidenedioxypregna-1,4,8-triene-3,20-dione; and the like.

The process of the present invention is carried out by contacting the starting material with a hydrogen halide acid of the group consisting of hydrogen chloride, hydrogen bromide and hydrogen iodide in a suitable polar solvent such as a lower alkanol, acetone, ethyl methyl ketone, dimethylformamide, dimethylacetamide, tetrahydrofuran, 1,4-dioxane and the like at a temperature ranging from about 0° C. to about 150° C. for a period of time ranging from several minutes to several hours.

The hydrogen halide acid may be introduced into the reaction medium as such, or, alternately, its elements may be introduced as a lithium halide salt of the group consisting of lithium chloride, lithium bromide and lithium iodide plus a mineral acid such as sulfuric acid, perchloric acid, nitric acid, phosphoric acid, or the like. After completion of the reaction, the desired steroids may be recovered by methods well known in the steroid art.

The compounds of the present invention are active in reducing serum cholesterol and therefore have utility as hypocholesteremic agents. The compounds also have no appreciable activity as estrogens. This lack of estrogenic activity makes the compounds useful as hypocholesteremic agents without the undesirable estrogenic feminizing side-effects.

The following examples illustrate in detail the preparation of representative steroids of the present invention.

EXAMPLE 1

*Preparation of 17β-acetoxy-9α-bromo-11β-hydroxyandrosta-1,4-dien-3-one.*—To a solution of 17β-acetoxyandrosta-1,4,9(11)-trien-3-one-(1.0 g.) [J. Org. Chem., 28, 785 (1963)] in dioxane (20 ml.) and water (4 ml.) is added N-bromoacetamide (1.0 g.) and 10% perchloric acid (1.0 ml.). After standing for 15 minutes at 20° C., the solution is treated with saturated sodium sulfite solution and water. The resultant precipitate is collected and crystallized from acetone-hexane to give the product of this example.

EXAMPLE 2

*Preparation of 17β-acetoxy-11β-hydroxyandrosta-1,4,8-trien-3-one.*—A suspension of 17β-acetoxy-9α-bromo-11β-hydroxyandrosta-1,4-dien-3-one (1.0 g.) (Example 1) in s-collidine (12 ml.) is refluxed for 10 minutes under an atmosphere of argon. The resultant mixture is cooled and the s-collidine hydrobromide is removed by filtration. The solvent is removed in vacuo and the resultant oil is triturated with hexane to give a solid. Crystallization from acetone-hexane gives the product described above.

EXAMPLE 3

*Preparation of 21-acetoxy-11β,-17α-dihydroxypregna-1,4,8-triene-3,20-dione.*—A suspension of 21-acetoxy-9α-bromo-11β,17α-dihydroxypregna-1,4-diene-3,20-dione (0.5 g.) [J. Am. Chem. Soc., 77, 4181 (1955)] and s-collidine (5 ml.) is heated to reflux under an atmosphere of argon for 10 minutes. The resultant mixture is cooled and the collidine hydrobromide is removed by filtration. The solvent is removed under reduced pressure and the resultant oil is triturated with hexane to give a pale yellow solid, melting point 201°-208° C. Crystallization from acetonehexane gives the product, melting point 215°-218° C.

EXAMPLE 4

*Preparation of 11β,17α,21-trihydroxypregna-1,4,8-triene-3,20-dione.*—Aqueous 10% potassium carbonate (1 ml.) is added to 21-acetoxy-11β,17α-dihydroxypregna-1,4,8-triene-3,20-dione (0.1 g.) in methanol (10 ml.) agitated by a nitrogen stream. The reaction mixture is kept at room temperature for 45 minutes, neutralized with acetic acid and poured into water, and extracted with ethyl acetate. Evaporation and crystallization from acetone-petroleum ether gives the triol, the product of the example.

EXAMPLE 5

*Preparation of 21-acetoxy - 6α - fluoro - 11β,17α - dihydroxypregna-1,4,8-triene-3,20-dione.*—A suspension of 21-acetoxy-9α-bromo-6α-fluoro - 11β,17α - dihydroxypregna-1,4-diene-3,20-dione (1.04 g.) [U.S. Patent No. 2,838,499 (1958)] in s-collidine (5 ml.) is refluxed for 15 minutes. The mixture is cooled and filtered from s-collidine hydrobromide. The filtrate is washed with ether and the solvent from the combined filtrate is removed under reduced pressure. The resultant oil is triturated with hexane. Crystallization from acetone-hexane gives the product, melting point 168.5°–169° C. dec.

EXAMPLE 6

*Preparation of 21-acetoxy-11β,17α-dihydroxy-6α-methylpregna-1,4,8-triene-3,20-dione.* — A suspension of 21 acetoxy-9α-bromo-11β,17α-dihydroxy-6α - methylpregna-1,4-diene-3,20-dione (1 g.) [J. Am. Chem. Soc., 79, 1515 (1957)] in s-collidine (5 ml.) is refluxed for 15 minutes, and the mixture is worked up as described in Example 5. Crystallization from acetonehexane gives the product of the example.

EXAMPLE 7

*Preparation of 21-acetoxy - 11β,17α - dihydroxy - 16α-methylpregna-1,4,8-triene-3,20 - diene.*—A suspension of 21-acetoxy-9α-bromo-11β,17α - dihydroxy - 16α - methylpregna-1,4-diene-3,20-dione (1.0 g.) [J. Am. Chem. Soc., 80, 4431 (1958)] in s-collidine (5 ml.) is refluxed and worked up as in Example 5. Crystallization from acetone-hexane gives the product described above.

EXAMPLE 8

*Preparation of 21-acetoxy-9α-bromo-11β-hydroxy-16α, 17α-isopropylidenedioxypregna-1,4-diene - 3,20 - dione.*— To a solution of 21-acetoxy-16α,17α-isopropylidenedioxypregna-1,4,9(11)-triene-3,20-dione (3.0 g.) [Steroids, 1, 331 (1963)] in dioxane (60 ml.) and water (12 ml.) is added N-bromoacetamide (1.165 g.) and 10% perchloric acid (3.0 ml.). After standing at 18° C. for 15 minutes, the solution is treated with saturated sodium sulfite solution and water. The resultant precipitate is collected and crystallized from acetone-hexane, melting point 207° C. dec.

EXAMPLE 9

*Preparation of 21-acetoxy-11β-hydroxy - 16α,17α - isopropylidenedioxypregna-1,4,8-triene-3,20 - dione.*—A suspension of 21-acetoxy-9α-bromo-11β - hydroxy - 16α,17α-isopropylidenedioxypregna-1,4-diene-3,20 - dione (1.4 g.) (Example 8) in s-collidine (17.5 ml.) is refluxed and worked up as in Example 5. Crystallization from acetone-hexane gives the product, melting point 237°–8° C.

EXAMPLE 10

*Preparation of 21-acetoxy-6α-fluoro-16α,17α-isopropylidenedioxypregna-1,4,9(11) - triene - 3,20 - dione.*—To a solution of 21-acetoxy-6α-fluoro-11β - hydroxy - 16α,17α-isopropylidenedioxypregna-1,4-diene-3,20 - dione (1.0 g.) [J. Am. Chem. Soc., 82, 3399 (1960)] in pyridine (20 ml.) is added N-bromoacetamide (0.47 g.) and the resultant solution is allowed to stand in the dark for 20 minutes. Sulfur dioxide is then bubbled through the solution while it is cooled in an ice-bath until the solution gives a negative starch-iodide test. Water is added dropwise with stirring until a precipitate results. The precipitate is collected and crystallized from acetone-hexane to give the product of the example.

EXAMPLE 11

*Preparation of 21-acetoxy-9α-bromo-6α-fluoro-11β-hydroxy-16α,17α-isopropylidenedioxypregna-1,4-diene - 3,20-dione.*—To a solution of 21-acetoxy-6α-fluoro-16α,17α-isopropylidenedioxypregna-1,4,9(11)-triene - 3,20 - dione (1.0 g.) (Example 10) in dioxane (20 ml.) and water (4 ml.) is added N-bromoacetamide (1.16 g.) and 10% perchloric acid (1.0 ml.) after standing 15 minutes at 18° C. the solution is worked up as in Example 8. The precipitate is crystallized from acetone-hexane to give the desired product.

EXAMPLE 12

*Preparation of 21-acetoxy-6α-fluoro-11β-hydroxy-16α, 17α - isopropylidenedioxypregna - 1,4,8 - triene - 3,20 - dione.*—A suspension of 21-acetoxy-9α-bromo-6α-fluoro-11β-hydroxy-16α,17α-isopropylidenedioxypregna-1,4 - diene-3,20-dione (1.0 g.) (Example 11) in s-collidine (5 ml.) is refluxed and worked up as in Example 5. Crystallization from acetone-hexane gives the product of the example.

EXAMPLE 13

*Preparation of 11β-hydroxy-16α,17α-isopropylidenedioxypregna-1,4,8-triene-3,20-dione.*—A suspension of 9α-bromo-11β-hydroxy- 16α,17α -isopropylidenedioxypregna-1,4-diene-3,20-dione (1 g.) [J. Am. Chem. Soc., 81, 4968 (1959)] in s-collidine (5 ml.) is refluxed and worked up as in Example 5. Crystallization from acetone-hexane gives the product of the example.

EXAMPLE 14

*Preparation of 17β-acetoxyestra-1,3,5(10),6,8-pentaen-3-ol.*—Treatment of a suspension of 17β-acetoxy-11β-hydroxyandrosta-1,4,8-triene-3-one (1.0 g) (Example 2) and acetone (20 ml.) with concentrated hydrochloric acid (0.25 ml.) for 20 minutes at a temperature of about 0° to 50° C. affords a solution. Addition of water gives a precipitate which is crystallized from acetone-hexane to give the product of this example.

EXAMPLE 15

*Preparation of estra-1,3,5(10),6,8-pentaen-3,17β-diol.*— To a solution of 17β-acetoxyestra-1,3,5(10),6,8-pentaen-3-ol (1.0 g) (Example 14) in methanol (30 ml.) is added 10% potassium carbonate (aqueous, 1 ml.) and the solution is refluxed for one-half hour. The reaction mixture is neutralized with acetic acid and most of the solvent is removed in vacuo. Water is added to the residue and the resultant precipitate is crystallized from acetone-hexane to afford the product of this example.

EXAMPLE 16

*Preparation of 3-hydroxyestra-1,3,5(10)6,8-pentaen-17-one.*—Treatment of a mixture of 11β-hydroxyandrosta-1,4,8-triene-3,17-dione (1.0 g.) [J. Org. Chem., 28, 789 (1963)] and acetone (20 ml.) with concentrated hydrochloric acid (0.25 ml.) for 20 minutes gives after working up, as in Example 14, the product of this sample.

EXAMPLE 17

*Preparation of 21-acetoxy-3,17α-dihydroxy-19-norpregna-1,3,5(10),6,8-pentaen-20-one.*—A solution of 21-acetoxy - 11β,17α - dihydroxypregna - 1,4,8-triene-3,20-dione (0.3 g.) (Example 3) lithium chloride (0.1 g.), one drop of 70% perchloric acid in dimethylformamide (15 ml.) is refluxed one-half hour. The mixture is evaporated in vacuo to an oil, water is added and the mixture is scratched to give an amorphous solid. Trituration of the solid with ether (25 ml.) and filtration gives an ether-soluble fraction. Removal of the ether and crystallization from methanol gives the produce of this example.

EXAMPLE 18

*Preparation of 3,17α,21-trihydroxy-19-nor-pregna-1,3,5 (10),6,8-pentaen-20-one.*—Treatment of a suspension of 11β,17α,21-trihydroxypregna-1,4,8-triene-3,20-dione (1.0 g.) (Example 4) in acetone (20 ml.) with concentrated hydrochloric acid (0.25 ml.) for 30 minutes and working up as in Example 14 gives the product of this example.

EXAMPLE 19

*Preparation of 21-acetoxy-6-fluoro-3-17α-dihydroxy-19-nor-pregna-1,3,5(10),6,8-pentaen-29-one.*—A solution of 21 - acetoxy - 6α-fluoro-11β,17α-dihydroxypregna-1,4,8-triene-3,20-dione (1.0 g.) (Example 5) lithium chloride (0.3 g.), one drop of sulfuric acid in dimethylformamide (50 ml.) is refluxed one-half hour and is worked up as is Example 17 to give the product of this example.

EXAMPLE 20

*Preparation of 21-acetoxy-3,17α-dihydroxy-6-methyl-19-nor-pregna-1,3,5(10),6,8-pentaen-20-one.*—A mixture of 21-acetoxy-11β,17α-dihydroxy-6α-methylpregna-1,4,8-triene-3,20-dione (1.0 g.) (Example 6) and acetone (20 ml.) is treated with concentrated hydrochloric acid (0.25 ml.) for 25 minutes at room temperature and is worked up as in Example 14 to give the product of this example.

EXAMPLE 21

*Preparation of 21-acetoxy-3,17α-dihydroxy-16α-methyl 19-nor-pregna-1,3,5(10),6,8-pentaen-20-one.*—A mixture of 21-acetoxy-11β,17α-dihydroxy-16α-methylpregna-1,4,8-triene-3,20-dione (1.0 g.) (Example 7) in acetone (20 ml.) is treated with concentrated hydrochloric acid (0.25 ml.) and is worked up as is Example 14. Crystallization from methanol gives the produce described above.

EXAMPLE 22

*Preparation of 21-acetoxy-3-hydroxy-16α,17α-isopropylidenedioxy - 19 - nor - pregna - 1,3,5(10),6,8-pentaen-20-one.*—A suspension of 21-acetoxy-11β-hydroxy-16α,17α-isopropylidenedioxypregna-1,4,8-triene-3,20-dione (0.5 g.) (Example 9) in acetone (10 ml.) is treated with concentrated hydrochloric acid (0.15 ml.) and is worked up as in Example 14 to give the product described above.

EXAMPLE 23

*Preparation of 21-acetoxy-5-fluoro-3-hydroxy-16α,17α-isopropylidenedioxy - 19 - nor - pregna-1,3,5(10),6,8-pentaen-20-one.*—Treatment of a suspension of 21-acetoxy-6α - fluoro - 11β - hydroxy - 16α,17α-isopropylidenedioxypregna-1,4,8-triene-3,20-dione (0.1 g.) (Example 12) in acetone (10 ml.) with concentrated hydrochloric acid (0.25 ml.) and working up the mixture as in Example 14, gives the product of this example.

EXAMPLE 24

*Preparation of 3-hydroxy-16α,17α-isopropylidenedioxy-19-nor-pragna-1,3,5(10),6,8-pentaen-20-one.*—To a mixture of 11β-hydroxy-16α,17α-isopropylidenedioxypregna-1,4,8-triene-3,20-dione (1.0 g.) (Example 13) and acetone (20 ml.) is added hydrochloric acid (0.25 ml.) and the resultant solution is worked up as in Example 14 to give the product described above.

We claim:

1. A method of preparing steroids of the formula:

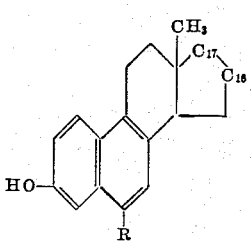

wherein $C_{17}$—$C_{16}$ is a divalent radical of the group consisting of

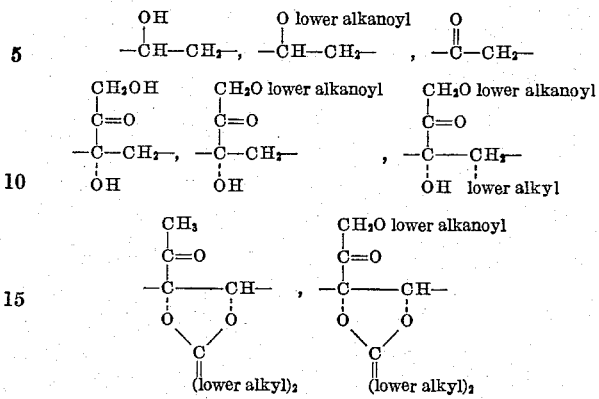

and R is a member of the group consisting of hydrogen, fluorine and lower alkyl which comprises contacting a steroid of the formula:

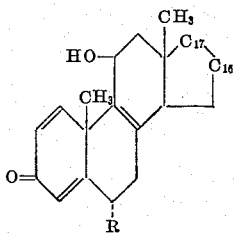

where $C_{17}$—$C_{16}$ and R are defined as above in a polar solvent with the elements of a hydrogen halide at a temperature within the range of about 0° C. to about 150° C. and recovering said product therefrom.

2. A method of preparing 17β-acetoxyestra-1,3,5(10),6,8-pentaen-3-ol which comprises contacting 17β-acetoxy-11β-hydrxoyandrosta-1,4,8-triene-3-one with hydrochloric acid in acetone within the range of about 0° C. to about 50° C. and recovering said compound therefrom.

3. A method of preparing 3-hydroxyestra-1,3,5(10),6,8-pentaen-17-one which comprises contacting 11β-hydroxyandrosta-1,4,8-triene-3,17-dione with hydrochloric acid in acetone within the range of about 0° C. to about 50° C. and recovering said compound therefrom.

4. A method of preparing 21-acetoxy-3,17α-dihydroxy-19-nor-pregna-1,3,5(10),6,8-pentaen-20-one which comprises contacting 21-acetoxy-11β,17α-dihydroxy-pregna-1,4,8-triene-3,20-dione with lithium chloride and perchloric acid in dimethylformamide within the range of about 0° C. to about 150° C. and recovering said compound therefrom.

5. A method of preparing 3,17α,21-trihydroxy-19-nor-pregna-1,3,5(10),6,8-pentaen-20-one which comprises contacting 11β,17α,21-trihydroxypregna-1,4,8-triene-3,20-dione with hydrochloric acid in acetone within the range of about 0° C. to about 50° C. and recovering said compound therefrom.

6. A method of preparing 21-acetoxy-6-fluoro-3,17α-dihydroxy-19-nor-pregna - 1,3,5(10),6,8 - pentaen - 20 - one which comprises contacting 21-acetoxy-6α-fluoro-11β,17α-dihydroxypregna-1,4,8-triene-3,20-dione with lithium chloride and sulfuric acid in dimethylformamide within the range of about 0° C. to about 150° C. and recovering said compound therefrom.

7. A method of preparing 21-acetoxy-3,17α-dihydroxy-6-methyl-19-nor-pregna-1,3,5(10),6,8 - pentaen - 20 - one which comprises contacting 21-acetoxy-11β,17α-dihydroxy-6α-methylpregna-1,4,8-triene-3,20-dione with hydrochloric acid in acetone within the range of about 0° C. to about 50° C. and recovering said compound therefrom.

8. A method of preparing 21-acetoxy-3,17α-dihydroxy-16α-methyl-19-nor-pregna-1,3,5(10),6,8-pentaen - 20 - one which comprises contacting 21-acetoxy-11β,17α-dihydroxy-16α-methylpregna-1,4,8-triene-3,20-dione with hydrochloric acid in acetone within the range of about 0° C. to about 50° C. and recovering said compound therefrom.

9. A method of preparing 21-acetoxy-3-hydroxy-16α,17α-isopropylidenedioxy-19 - nor - pregna - 1,3,5(10),6,8-pentaen-20-one which comprises contacting 21-acetoxy-11β-hydroxy-16α,17α - isopropylidenedioxypregna - 1,4,8-triene-3,20-dione with hydrochloric acid in acetone within the range of about 0° C. to about 50° C. and recovering said compound therefrom.

10. A method of preparing 21-acetoxy-6-fluoro-3-hydroxy-16α,17α-isopropylidenedioxy-19-nor - pregna - 1,3,5(10),6,8-pentaen-20-one which comprises contacting 21-acetoxy-6α-fluoro-11β-hydroxy-16α,17α - isopropylidenedioxy-pregna-1,4,8 - triene - 3,20 - dione with hydrochloric acid in acetone within the range of about 0° C. to about 50° C. and recovering said compound therefrom.

11. A method of preparing 3-hydroxy-16α,17α-isopropylidenedioxy-19-nor-pregna-1,3,5(10),6,8 - pentaen - 20-one which comprises contacting 11β-hydroxy16α,17α-isopropylidenedioxypregna-1,4,8-triene-3,20-dione with hydrochloric acid in acetone within the range of about 0° C. to about 50° C. and recovering said compound therefrom.

No references cited.

LEWIS GOTTS, *Primary Examiner.*

H. FRENCH, *Assistant Examiner.*